(No Model.) 2 Sheets—Sheet 1.

F. M. BOWELL.
MACHINE FOR EXTRACTING SEEDS FROM CUCUMBERS.

No. 361,344. Patented Apr. 19, 1887.

Witnesses
Ricy C. Bowen
J. V. Garner

Inventor,
Francis M. Bowell
By his Attorneys
C. A. Snow & Co.

(No Model.) 2 Sheets—Sheet 2.

F. M. BOWELL.

MACHINE FOR EXTRACTING SEEDS FROM CUCUMBERS.

No. 361,344. Patented Apr. 19, 1887.

Witnesses

Inventor,
Francis M. Bowell;
By his Attorneys

N. PETERS, Photo-Lithographer, Washington, D. C.

UNITED STATES PATENT OFFICE.

FRANCIS MARION BOWELL, OF ROLLING PRAIRIE, INDIANA.

MACHINE FOR EXTRACTING SEEDS FROM CUCUMBERS.

SPECIFICATION forming part of Letters Patent No. 361,344, dated April 19, 1887.

Application filed September 21, 1886. Serial No. 214,207. (No model.)

*To all whom it may concern:*

Be it known that I, FRANCIS M. BOWELL, a citizen of the United States, residing at Rolling Prairie, in the county of La Porte and State of Indiana, have invented a new and useful Improvement in Machines for Extracting the Seeds from Cucumbers, of which the following is a specification.

My invention relates to an improvement in machines for extracting the seeds from cucumbers; and it consists in the peculiar construction and combination of devices, that will be more fully set forth hereinafter, and particularly pointed out in the claims.

Figure 1:
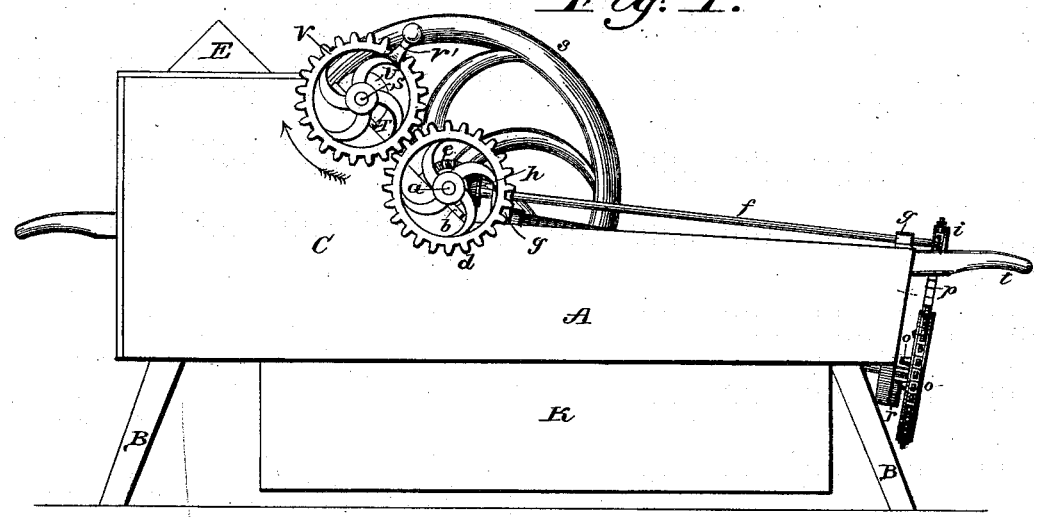
Figure 2:
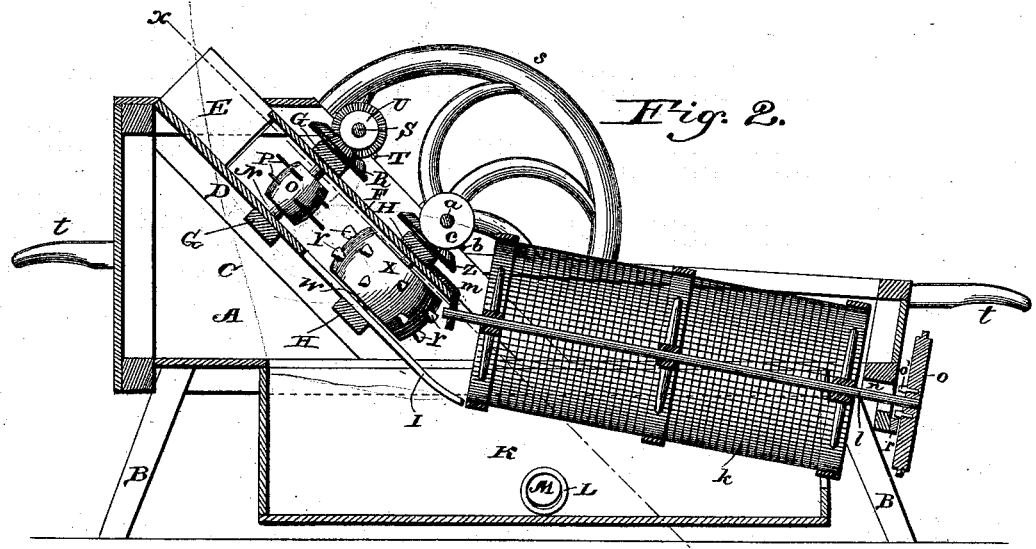
Figure 6:
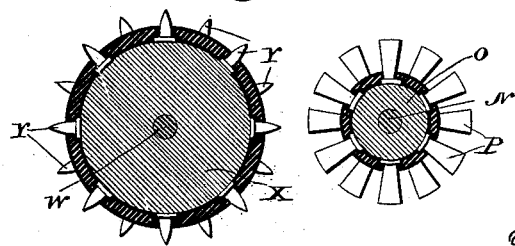
Figure 3:
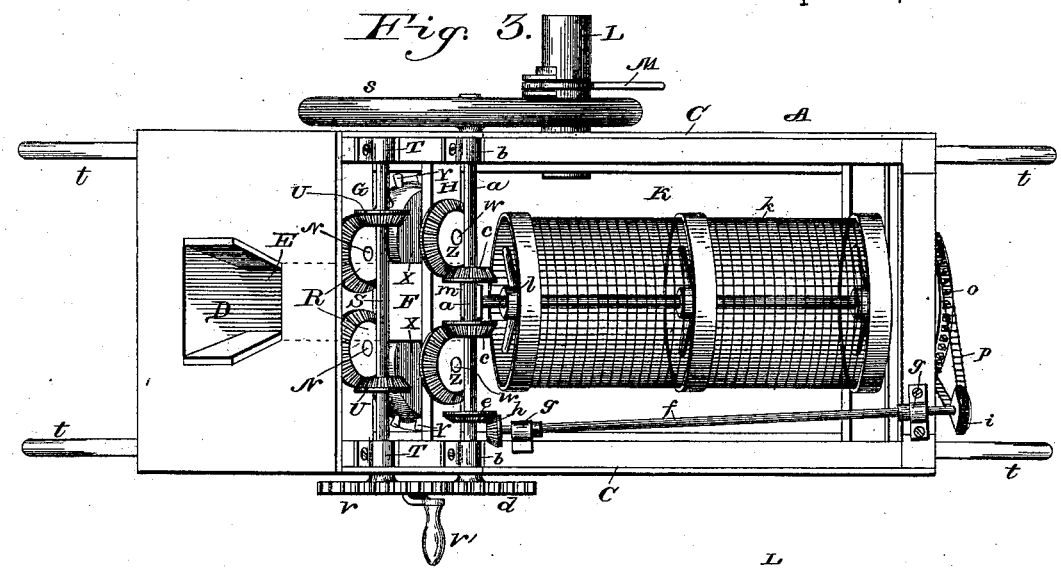
Figure 4:
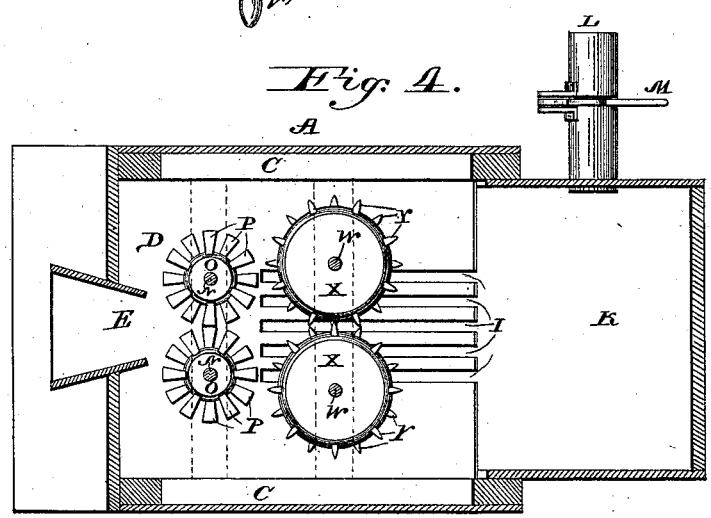
Figure 5:
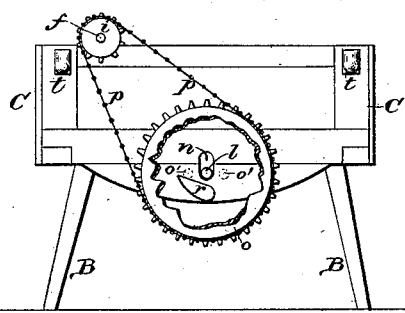

In the drawings, Figure 1 is a side elevation of a machine embodying my improvements. Fig. 2 is a vertical longitudinal sectional view of the same. Fig. 3 is a top plan view. Fig. 4 is a transverse sectional view on the line *x x* of Fig. 2. Figs. 5 and 6 are detail views.

A represents a rectangular horizontal frame, which is provided with supporting-legs B at its corners.

C represents sides, which extend vertically from the frame, and are higher at one end of the frame than at the other. An inclined board, D, is arranged between the sides C at the higher end thereof, and on the said board, at its upper end, is arranged a hopper or feed-spout, E. Above the board D is a board, F, which is arranged at a suitable distance from said board D and is parallel therewith, forming an inclined chute.

G represents coss-bars, which connect the sides C and extend across the upper side of the board F and below the board D; and H represents similar cross-bars, which also connect the sides C and extend across the upper side of the lower end of the board F and the under side of the board D.

In the center of the inclined board D, at the lower portion thereof, are a series of parallel slots, I, which extend longitudinally in the said board and have their lower ends open.

K represents a receiving-box, which is attached to the frame A and depends therefrom, and the said receiving-box is provided on one side, at the center thereof, with a discharge-spout, L, having a cut-off, M.

Near the upper end of the hopper or feed-trough E, but below the mouth and on opposite sides thereof, are journaled shafts N, which have their bearings in the board D and in the upper cross-bar, G. Attached to the said shafts are rollers O, the faces of which are covered by rubber belts or rings, in which are inserted and from which project cutting-knives P, the ends of which come in contact with each other between the opposing sides of the rollers. On the upper ends of the shafts N, which project above the cross-bar G, are attached miter gear-wheels R.

S represents a transverse shaft, which is journaled in blocks T, that are secured on the upper edges of the sides C, immediately above the cross-bar G, and the said shaft is provided with miter-pinions U, which mesh with the wheels R. On one end of the shaft S is rigidly secured a gear-wheel, V, which is provided with a crank-handle, V'.

W represents a pair of shafts, which have their bearings in the lower portion of the inclined board D and in the upper cross-bar, H, and to the said shafts are attached rollers X, the faces of which are covered with rubber collars or rings, in which are inserted and from which project macerating-teeth Y. The inner sides of the said rollers X are arranged closely together, and are in line with the longitudinal center of the hopper or feed-spout E. The upper ends of the shafts W project beyond the upper cross-bar, H, and to the said shaft are attached miter gear-wheels Z.

*a* represents the transverse shaft, which is journaled in blocks *b*, secured on the sides C, above the cross-bar H, and near the center of the said shaft are secured miter-pinions *c*, which mesh with the inner edges of the wheels Z. To one end of the shaft *a* is secured a gear-wheel, *d*, which meshes with the wheel V, and near the wheel *d* a miter gear-wheel, *e*, is attached to the shaft *a*.

*f* represents a shaft, which extends longitudinally along one side of the frame or case, and is journaled in blocks *g*. To the inner end of the said shaft is attached a miter-pinion, *h*, which meshes with the wheel *e*, and to the outer end of the said shaft, which projects beyond the outer end of the frame or case A, is attached a small sprocket-wheel, *i*.

*k* represents an inclined cylindrical screen, which is arranged longitudinally in the case or frame, the central shaft, *l*, of the said screen having its upper end journaled in a bracket, *m*, that depends from the board F. The lower end of the shaft *l* is journaled in a vertical slot or opening, *n*, which is made in the outer end of the frame A, and to the extreme outer end of the said shaft *l* is attached a sprocket-wheel, *o*, which is connected to the small sprocket-wheel *i* by means of an endless sprocket-chain, *p*. From the inner side of sprocket-wheel *o*, and on opposite sides of its center, project tappet-pins *o'*.

*r* represents an inclined cam, which projects from the outer end of the frame or case A, and against which the tappet-pins *o'* are adapted to strike as the screen revolves.

*s* represents a fly-wheel, which is secured to the outer end of the shaft *a*.

To the ends of the frame or case A are attached handles *t*, by means of which the machine may be readily transported from one place to another.

The operation of my invention is as follows: When the cucumbers have been sufficiently cured, they are fed into the hopper or feed-trough E, and are directed between the rollers O, having the cutting-teeth P. The operator grasps the crank V' and rotates it in the direction indicated by the arrow in Fig. 1, and this communicates motion to the rollers O, the rollers X, and the inclined cylindrical screen, through the connecting mechanism previously described. The cucumbers are cut to pieces by the knives of the rollers O, and are fed therefrom between the rollers X, which are armed with the macerating-teeth, as before described. These teeth separate the seeds from the rinds, and the seeds and rinds are fed by the inclined board D to the upper end of the rotating cylindrical screen. Twice at each revolution of the latter one of its tappet-pins, *o'*, strikes the cam *r*, thus causing the lower end of the shaft *l* to rise in the slotted opening in which it is journaled, thus giving a jar or agitation to the screen and causing it to discharge the cucumber-seeds through its meshes into the receiving-box K. The rinds of the cucumbers are discharged from the lower open end of the cylindrical screen onto the ground, and the semi-fluid matter in the cucumbers, which is liberated by the cutting and macerating teeth, escapes directly through the slots I in the board D into the receiving-box, carrying a portion of the seeds with it.

The cucumber-seeds may be drawn from the receiving-box through the discharge spout L by opening the cut-off M.

Having thus described my invention, I claim—

1. The combination, in a machine for extracting the seeds from cucumbers, of the case or frame A, having the inclined board D, provided with the hopper or feed-trough, the board F, above the board D, forming the inclined chute, the rollers O, journaled at the upper end of the said chute, having the cutting-teeth, the rollers X, journaled below the rollers N and having the macerating-teeth, the inclined rotating screen having its upper end communicating with the lower end of the board D, and gearing connecting the rollers O and X, and the rotating screen for operating the same simultaneously, substantially as described.

2. The combination, in a machine for extracting the seeds from cucumbers, of the case or frame A, the inclined rotating screen having the lower end of its shaft journaled in a vertical opening in the case or frame, and provided with a wheel having tappet-pins to strike against a cam with which the frame is provided, whereby the screen will be jarred as it rotates by raising the lower end of its shaft in the opening in the frame, substantially as described.

3. In a machine for extracting the seeds from cucumbers, the combination of the chute through which the cucumbers are fed, the cutting-knives P, to cut the cucumbers into pieces, and the macerating-teeth Y, to separate the seeds from the rinds, the combined action of the knives and teeth liberating the semi-fluid contents of the cucumbers, the box or receptacle K, to catch the said semi-fluid contents, carrying a portion of the seeds with it, and the screen to catch the rinds and the remaining portion of the seeds and separate the seeds from the rinds, as set forth.

In testimony that I claim the foregoing as my own I have hereto affixed my signature in presence of two witnesses.

FRANCIS MARION BOWELL.

Witnesses:
  GEO. C. DORLAND,
  H. C. SHANNON.